Patented Nov. 29, 1938

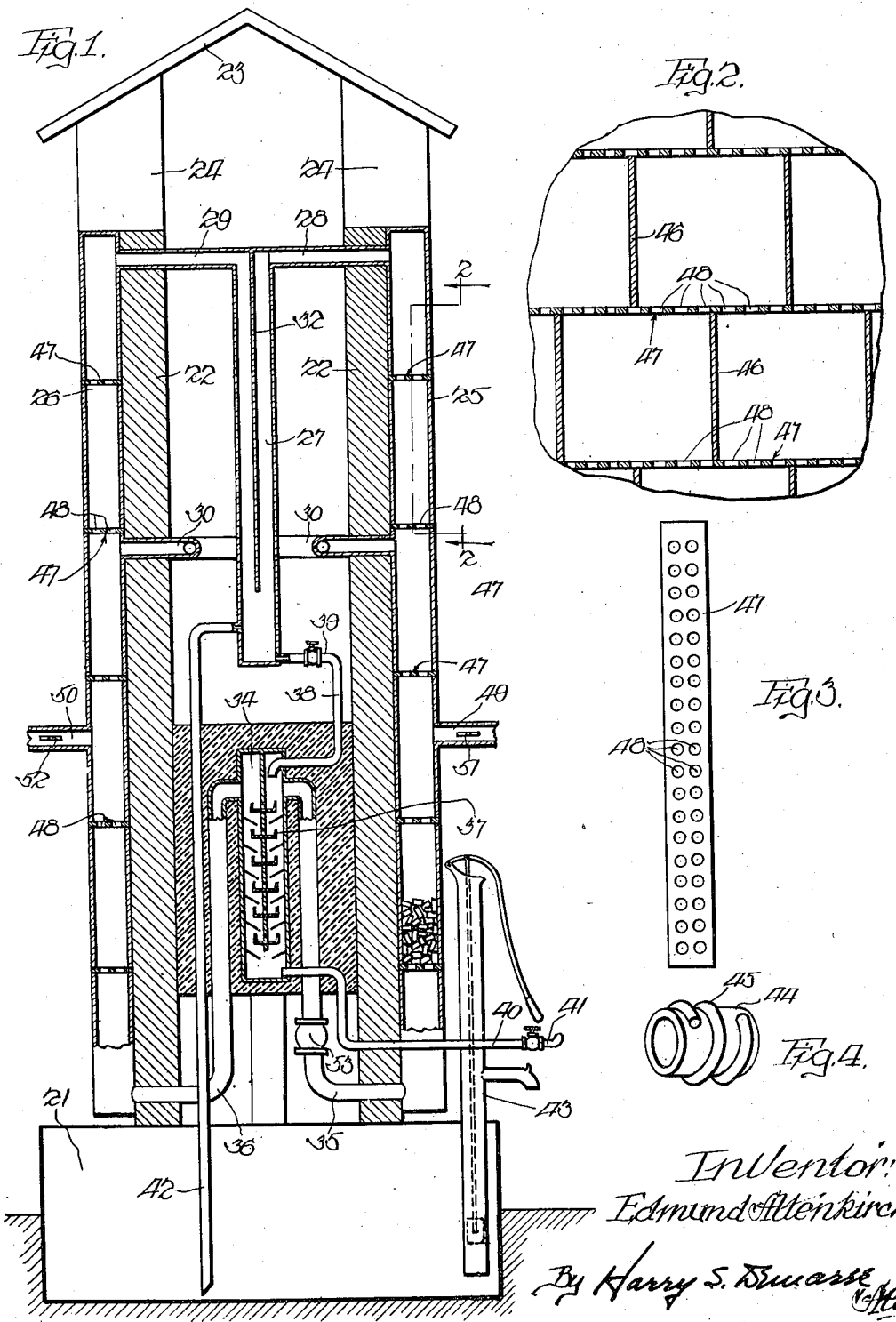

2,138,687

UNITED STATES PATENT OFFICE 2,138,687

WATER ACCUMULATOR

Edmund Altenkirch, Neuenhagen, near Berlin, Germany

Application March 9, 1934, Serial No. 714,740
In Germany March 10, 1933

15 Claims. (Cl. 62—156)

This invention relates to apparatus for removing water from the atmosphere and to intermittent absorption refrigerating apparatus for cooling water so accumulated.

In the copending application of Edmund Altenkirch, Serial Number 711,679, filed February 17, 1934, means for removing water from the atmosphere is disclosed and claimed. In the copending application of Edmund Altenkirch, Serial Number 711,680, filed February 17, 1934, means for cooling water supplied from a water tap to the apparatus is disclosed and claimed. In accordance with the present invention, it is proposed to combine the apparatuses of the above mentioned applications and so provide means for removing water from the atmosphere and for cooling this water automatically so as to make it palatable.

It is also proposed, in accordance with the present invention, to provide novel means for removing water from the atmosphere in an inexpensive manner. In many arid regions throughout the world and on ships at sea great difficulty is experienced in obtaining fresh water. It is an object of the present invention to provide a simple arrangement for removing water from the atmosphere, thus making it available for human consumption, or for other purposes.

It is a further object of the invention to provide an arrangement for removing water from the atmosphere which is capable of operating to low temperatures so that it may utilize the heat of the sun for operating it.

Another object of the invention is to so construct the apparatus that the water collected from the atmosphere may be cooled to a temperature considerably below that of the atmosphere.

Another object of the invention is to employ wood as absorbing material for absorbing water out of the atmosphere or for absorbing other fluids and to so treat the wood and shape it as to make it suitable as an absorbing medium.

Various other objects and advantages reside in certain novel features of the arrangement and construction of parts as will be apparent from the following description taken in connection with the accompanying drawing in which:

Figure 1 is a vertical cross-sectional view of a water accumulator and refrigerator constructed in accordance with the principles of the present invention.

Figure 2 is a fragmentary cross-sectional view of the absorbent containers employed in the arrangement of Figure 1, a view being taken on the line 2—2 of Figure 1.

Figure 3 is a plan view of spacer bars employed in the absorber-generators of Figure 1, and Figure 4 is a perspective view of one of the absorbing elements employed in the arrangement of Figure 1.

Referring to the drawing in detail, and more particularly to the apparatus of Figures 1 to 3, it will be seen that the apparatus is in the form of a small house. On the water tank 21, which is used as a foundation, vertical walls 22 are mounted and covered by a roof 23 under which air may be circulated through the openings 24.

A rectangular, vertically extending, metallic vessel 25 is provided on the east side of wall 22 of the house and a similar vessel 26 is provided on the west side of the house. These vessels extend nearly the entire height of the wall 22. By means of the horizontal pipes 28 and 29 the upper ends of the vessels 25 and 26 are connected to a vertically extending chamber 27 on the inside of the house. The central portions of the chambers 25 and 26 are connected by means of the horizontal pipe 30. The vessel 27 forms a part of conduit means connecting vessels 25 and 26 to each other. Because of the vertically extending partition 32 in vessel 27 gases flowing from one chamber 25 or 26 to the other flow downwardly and then upwardly.

The lower end of chambers 25 and 26 are connected to an evaporator 34 by means of the pipes 35 and 36. The evaporator may consist merely of a metallic vessel closed at the top and bottom and provided with a number of baffle plates as shown in 37. These baffle plates should preferably have their bottoms perforated so as to permit water to slowly trickle downwardly therethrough without remaining on the plates, except for a short period of time. The evaporator is covered with insulation as shown.

A pipe 38, provided with a valve 39, is connected to the lower end of the vessel 27 to the top of the evaporator 34 and serves to convey water to the evaporator. Cold water may be removed from the bottom of the evaporator through the pipe 40 provided with a drinking faucet 41. The lower end of the chamber 27 is also connected to the water tank 21 by means of the drain pipe 42.

Each of the vessels 25 and 26 acts as an absorber-generator. Each vessel is filled with absorbing material which, in accordance with one feature of the present invention, may consist of small hollow open cylinders of wood 44. One such absorbing element is shown in Figure 4. These small cylinders of wood are so constructed as to present a large surface as compared with their volume. Each cylinder may be made by cutting branches or twigs of bushes or trees and removing the bark therefrom. Holes may be bored through the pith of the cylinders in order to obtain more surface for contacting air. Branches and twigs of elder trees have been found suitable for this purpose. If the length of the cylinders are not much greater than their diameter, they do not pack down in the vessels 25 and 26 and do not interfere with the flow of air therethrough.

If desired, the cylinders 44 may be surrounded with the coil of wire as indicated in 45 of Figure 4. A metal screen may be used instead of the wire. By using some such means, the cylinders will be better spaced in the vessels 25 and 26 and offer a more uniform resistance to the flow of air through these vessels. While the absorbing element shown in Figure 4 illustrates the preferred form of the invention it is obvious that other absorbing mediums may be used such as silica gel, charcoal, wood shavings or the like. If separated by proper screens, shavings constitute a good absorbing element as they present a very large surface compared to their volume.

The use of pieces of wood of very small dimensions such as sawdust is also contemplated. This material can be worked into the form of a paste and brought into the shape of sheets similar to paper.

In order to prevent the absorbing material from settling, a number of boxes such as are indicated at 46 in Figure 2 may be employed in the vessels 25 and 26. These boxes, which may be of any suitable construction material, have their walls arranged in staggered relation as shown in Figure 2 so as to cause the air passing therethrough to flow over a tortuous path. The boxes 46 are preferably supported on horizontally extending partitions 47, one of which is shown in detail in Figure 3, each partition being provided with a number of holes as shown at 48.

The apparatus may be operated to remove moisture from the air and cool the same without the aid of any moving parts, such as fans or blowers or the like, although it is to be understood that such devices may be employed if desired. The vessels 25 and 26 are open to the atmosphere or to the pumps or fans, if such devices are employed, by means of the air conduits 49 and 50, each of which may be provided with a damper or other regulating device as shown at 51 and 52. One of the gas pipes 35 or 36 leading to the evaporator 34 may also be provided with a regulating valve as shown at 53 in order to control the passage of air through the evaporator.

The apparatus may be operated as follows:

In the forenoon the sun may be caused to shine against the east wall of the house and heat the absorbing material and air in the vessel 25. The air then rises in this vessel and more air is sucked in through the conduit 49. Because the vessel 25 is heated the absorbent therein (which may have taken up moisture during a previous period) gives up moisture to the air. Part of the air passes through the pipe 28 and part through the pipe 30. The relative proportion of air passing these conduits into the vessel 27 may be varied by the resistance in the conduits or by valves not shown. The vessel 27 acts as a condenser since it is at a lower temperature than the vessel 25 and is always in the shade and exposed to the air in the house. The water which collects in the condenser 27 may either flow into the water tank 21 through the pipe 42 or pass into the evaporator 34 when the valve 39 in the pipe 38 is open.

The air flows from the condenser 27 through the pipe 29 into the vessel 26 on the west side of the house which is also in the shade during the morning. In this vessel the air gives up its moisture content to the absorbent (which may have been dried during a previous period) and thus prepares the absorbent for the expulsion of water when it is heated in the afternoon. The air then leaves the apparatus through the air conduit 50 in a dryer state than that which enters the apparatus through the pipe 49, in proportion to the amount of water which has condensed in the vessel 27.

The dampers 51 and 52 and the valve 53 may be so regulated as to cause part or all of the air flowing downwardly in the vessel 26, during the period when this vessel is cooled, to flow through the evaporator and back to the vessel 25 through the gas pipes 35 and 36. The pipes 35 and 36 may be in heat exchange relation with each other but this is not shown in the drawing for the sake of simplicity. The lower portions of the vessels 25 and 26 are not filled with absorbent material and permit the air to reach atmospheric temperature before entering the pipes 35 and 36.

During the time when the vessel 25 is being heated the air which flows into the lower portion of the vessel 26 is extremely dry. Hence when it flows through the evaporator water supplied to the baffle plates 37 evaporates into it and cools the remainder of the water which trickles down into the lower portion of the evaporator 34. Thus a refrigerating effect is produced.

In the afternoon the west side of the house is exposed to the heat of the sun so that air in the vessel 26 is heated and that in the vessel 25 is cooled. The operation of the apparatus then continues exactly as previously described except for the reversal of heating and flow of the air.

While only one embodiment of the invention has been shown and described herein it is obvious that various changes may be made without departing from the invention or the scope of the annexed claims.

I claim:

1. Apparatus for removing moisture from the air and for cooling the same, comprising vessels providing two absorber-generators, a condenser, an evaporator, conducting means connecting said vessels for circulating air from the atmosphere through one absorber-generator, the condenser and the other absorber-generator, and for circulating air through the evaporator from the last mentioned absorber-generator to the first mentioned absorber-generator and means for conveying water from the condenser to the evaporator.

2. A combined water accumulator and refrigerator comprising means for removing water from the air to dry the air and provide a supply of water and means for conveying some of the dried air over some of the water so obtained to cause a portion of the water to evaporate to cool another portion.

3. A combined water accumulator and refrigerator comprising wooden material adapted to absorb moisture from the air, means for circulating moisture laden air over said material to dry the air, means for subjecting the material to a source of heat to cause the same to give up the moisture removed from the air, means for condensing the moisture and means for subjecting some of the condensate to some of the dried air to cause the condensate to evaporate and produce a cooling effect.

4. A process of cooling which involves altering the water vapour content of air by hygroscopic action and comprises a repeated cycle in one part of which air is passed over wood under such conditions that the wood absorbs water vapour from the air, heat being dissipated or removed from the wood to keep its temperature down to the required value, and in the other part of which air is passed over the wood at a higher temperature under such conditions that the wood gives up water vapour to the air, heat being supplied to the wood to keep its temperature up to the required value, the air dried in the former part of the cycle being passed through an evaporator containing water the evaporation of which produces a cooling effect.

5. A process of altering the water vapour content of air by hygroscopic action comprising a repeated cycle in one part of which air is passed over wood under such conditions that the wood absorbs water vapour from the air to dry the air for a useful purpose, heat being dissipated or removed from the wood to keep its temperature down to the required value, and in the other part of which air is passed over the wood at a higher temperature under such conditions that the wood gives up water vapour to the air, heat being supplied to the wood to keep its temperature up to the desired value to liberate the moisture therein contained, the higher temperature of the wood during the portion of the cycle in which the wood is giving up moisture being effected at least in part by the heat of the sun.

6. In combination with means for changing the condition of a mixture of fluids, a plurality of pieces of wood each having large surface areas relative to its cubical size, and means secured to said pieces to prevent contact of substantial portions of said surface areas with other objects so that the fluid mixture can contact the surface areas, said pieces of wood being capable of removing one of said fluids from said mixture.

7. Apparatus for conditioning air comprising two interconnected chambers one of which is adapted to be heated while the other remains unheated, each of said chambers containing pieces of wood having large surface areas relative to their cubical size, and including means to prevent contact of substantial portions of said surface areas with adjacent pieces, and means for passing air alternately in first one direction through said chambers and then in the other whereby water vapor is absorbed by the wood in the heated chamber to dry the air for a useful purpose, and the previously moistened wood in the unheated chamber is regenerated for subsequent use in drying more air.

8. An absorber for use in conditioning air comprising a chamber of heat conducting material, partitioning means within the chamber providing a number of cells, moisture absorbing material including pieces of wood in said cells having large surface areas relative to their cubical size, and including means to prevent contact of substantial portions of said surface areas with adjacent portions of said pieces, said last named means and said cells cooperating to provide uniform distribution of the air to be conditioned as it flows through said chamber as well as a minimum resistance to flow, and said absorber being provided with an air inlet and an air outlet.

9. Apparatus for conditioning air comprising two chambers facing east and west respectively whereby the sun will shine upon one chamber in the forenoon and upon the other in the afternoon, means preventing the sun from heating more than one chamber at once, each of said chambers containing pieces of wood having large surface areas, said pieces of wood being so positioned in said chambers as to provide a minimum resistance to air flow therethrough and a maximum distribution of air over the surfaces of said pieces of wood, and means including an inclosure to receive conditioned air interconnecting said chambers, said chambers also communicating with the atmosphere whereby atmospheric air flows through one chamber in the forenoon to be dried for use in said enclosure, and then through the other chamber to regenerate the wood therein for subsequent use in drying air in the afternoon when the air flows in the opposite direction through said chambers and enclosure.

10. Apparatus for conditioning air comprising chambers facing to the east and to the west respectively so that the sun shines upon those facing east in the forenoon and those facing west in the afternoon, means preventing the sun shining upon both the east and west chambers at the same time, means including enclosures shielded from the sun interconnecting the top portions of the east and west chambers respectively, and the bottom portions of the east and west chambers respectively, wooden absorbent material in each of said chambers, and means supplying air to the chambers heated by the sun during the forenoon whereby the heat of the sun liberates moisture in the wood to the air after which the moisture condenses in one of said enclosures, the de-humidified air then passing through the other chamber where it is further dried by the wood, after which the dried air passes into the other of said enclosures where evaporative cooling is produced by the evaporation of water into the dry air.

11. Apparatus for drying air comprising two chambers containing wood as absorbent, means for subjecting first one and then the other of said chambers to the heat of the sun, and means for conveying air alternately first through the cooler chamber and then through the heated chamber to condition the air.

12. Apparatus for drying air and obtaining water from it, comprising a condenser, two absorber-generators containing absorbent material composed of wood, and means whereby first one and then the other of said absorber-generators may be alternately subjected to a source of heat and then shielded therefrom, and air from the atmosphere may be conveyed through the warmer absorber-generator, the condenser, and the cooler absorber-generator in turn, the direction of flow through the apparatus being reversed when the temperature difference between said absorber-generators reverses.

13. An absorber-generator adapted for use in conditioning air comprising a vessel having an impervious wall of heat conducting material, an air inlet, an air outlet, and wooden absorbent material in said vessel, said material being partly in the form of small pieces having large surface areas and partly in the form of structural members for maintaining portions of the small pieces segregated from other portions of said pieces.

14. Air conditioning apparatus including an absorber made in part of wood, said absorber having an air inlet and an air outlet, said inlet being positioned above said outlet whereby when the absorber is heated air tends to enter said inlet, become humidified as the wood over which it flows liberates moisture, and then to pass out through said outlet leaving said wood in dried condition, and whereby when said absorber is not heated air tends to flow downwardly through said outlet, over the dried wood where moisture is absorbed from the air, and then out through said inlet in dried condition.

15. In combination with an apparatus for conditioning air, casing means having an air inlet and an air outlet for air to be conditioned, and an absorbent medium supported in said casing between said inlet and outlet in the path of the air to be conditioned, said medium comprising cellulosic material in thin sheet form, the arrangement being such that said medium absorbs moisture from the air very readily when the conditions are such that absorption can take place, and such that said medium gives up moisture very readily to reactivate the medium when the conditions are such that reactivation can take place.

EDMUND ALTENKIRCH.